G. S. BAKER.
APPARATUS FOR FEEDING PLASTIC MATERIAL INTO RECEPTACLES.
APPLICATION FILED MAR. 26, 1912.
1,035,299.
Patented Aug. 13, 1912.
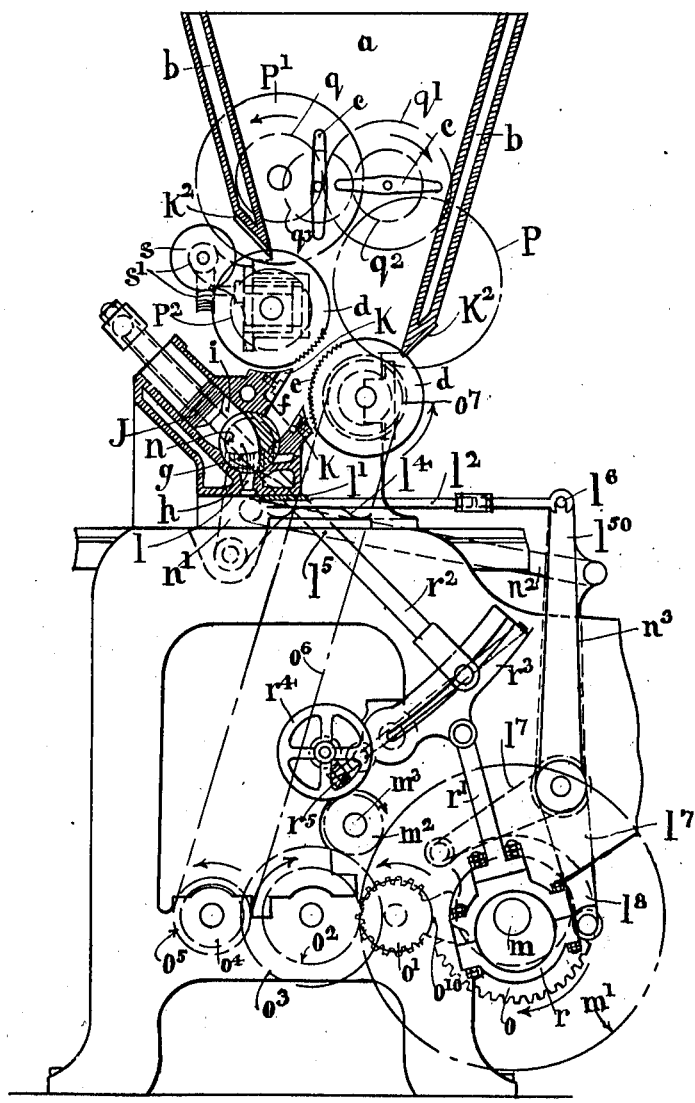
Witnesses
Inventor
George Samuel Baker
by Attorney

UNITED STATES PATENT OFFICE.

GEORGE SAMUEL BAKER, OF WILLESDEN JUNCTION, LONDON, ENGLAND.

APPARATUS FOR FEEDING PLASTIC MATERIAL INTO RECEPTACLES.

1,035,299.     Specification of Letters Patent.     Patented Aug. 13, 1912.

Application filed March 26, 1912. Serial No. 686,300.

*To all whom it may concern:*

Be it known that I, GEORGE SAMUEL BAKER, a subject of the King of England, residing at Willesden Junction, London, in England, have invented certain new and useful Improvements in Apparatus for Feeding Plastic Material into Receptacles, of which the following is a specification.

This invention relates to apparatus for feeding plastic material particularly chocolate and the like into molds or other receptacles and the object is to so improve devices of this character that material of a stiff consistency can be readily fed to and through a discharging device and thus into molds, or be otherwise disposed of according to requirements.

It has been previously proposed in apparatus of this class to provide at the bottom of the hopper a reciprocating slide having a pocket which is brought into communication with said hopper and with a measuring chamber in which works a plunger which draws the material out of the hopper and subsequently forces it through a discharge nozzle, but this device has been found impracticable for use with materials of a stiff consistency for the reason that the plunger is unable to properly draw the material from the hopper into the pocket in the slide owing to the restricted aperture leading thereinto and further that material which is drawn in clogs therein and cannot be efficiently ejected through the discharge nozzle. It has also been proposed to positively feed the material by means of a worm and to use a rotary valve between the hopper and discharge nozzle, this valve having a straight through passage which is alternately brought into communication with the hopper and measuring chamber and with the latter and discharge nozzle, but here again the form of the passage through the valve and the inadequate strength of the plunger in the measuring chamber render this form quite inoperative where materials of stiff consistency are concerned, although both forms of devices above described are admirably adapted for use with materials in semi liquid or highly plastic condition.

Now, according to the present invention, I provide a form of apparatus in which materials of stiff consistency or those of only a small degree of plasticity can be readily fed to the measuring chamber and thence through the discharge nozzle, the plunger not being used to exert any suctional effect on the material but the latter being positively forced out of the hopper into a form of rotary valve which has a curved channel therethrough permitting a clear run for material between the hopper and measuring chamber, and between the latter and discharge nozzle, the valve being then rotated to bring the measuring chamber into communication with said discharge nozzle in the usual way, so that the material can be forced through said nozzle by the plunger.

The invention also comprises the combination with the particular construction of parts described, of mechanism for actuating said parts.

An example of apparatus constructed according to this invention is represented in the annexed drawing which shows a sectional elevation of the hopper, measuring and discharging devices and appurtenant parts with the operating mechanism in elevation.

$a$ designates the hopper which may have the usual jacket $b$ for a heating or cooling medium, and in which are mounted paddles $c$ for working up the material and exerting a feeding or forcing action on the material to assist in directing it toward the feed rolls $d$ which are preferably provided with closely positioned grooves $e$ on their peripheries or otherwise roughened and which positively force the material through the outlet $f$ of the hopper into the rotary valve $g$ which, as shown, has a curved channel $h$, shown in full lines, of wide aperture occupying a large proportion of the body of the valve and being substantially of the same cross sectional area as the measuring chamber $i$ which contains the plunger $j$. With this form of valve it will be seen that the material has a clear run through between the hopper and the measuring chamber and between the latter and discharge nozzle without having to pass through any restricted apertures, the material being positively forced along by the feed rolls $d$ independently of any suctional action of the plunger $j$ which only becomes actively operative to force the material through the discharge nozzle $l$ when the valve has been rotated into the position shown in full lines.

$k$ and $k^2$ show scrapers or slides between the feed rolls and valve and between the feed rolls and hopper respectively to shut off the open space between these parts but allow chocolate accumulated in the grooves of the rolls to be carried around with them and pass back into the hopper.

Below the discharge nozzle $l$ is a reciprocating cut off blade $l^1$ for cutting off the portion of plastic material delivered through said nozzle, said blade being mounted on an adjustable rod $l^2$ which is pressed upward by a spring $l^4$ attached to a block $l^5$ slidable on the table of the machine.

Any suitable mechanisms may be used for operating the parts described in proper time relation but those shown in the drawings include a lever $l^{50}$ to which the rod $l^2$ is pivotally attached as by hook $l^6$ and connected to a pair of arms $l^7$ operated by a cam $l^8$ on a shaft $m$ driven by means of a spur-wheel $m^1$ meshing with a pinion $m^2$ on the main driving shaft $m^3$.

The valve is rocked by means of a pinion $n$ secured to its spindle and in mesh with a quadrant $n^1$ connected by a rod $n^2$ to a lever $n^3$ operated by a pair of arms and cam similar to $l^7$, $l^8$ above mentioned.

The feed rolls $d$ are intermittently operated, that is to say, they are rotated when the valve is open to the hopper and remain stationary when said valve is closed thereto by means of interrupted gearing including a partially toothed wheel $o$ on shaft $m$ which coöperates with another partially toothed wheel $o^1$ on the axle of which is a pinion $o^{10}$ meshing with a pinion $o^2$ having integral therewith a spur-wheel $o^3$ meshing with a pinion $o^4$ which drives chain wheel and chain gear $o^5$, $o^6$, $o^7$ operating one of the feed rolls $d$, this wheel being geared to the other roll by means of the train of gearing $p$, $p^1$, $p^2$ which in turn operate the paddles $c$ through gearing $q$, $q^1$, $q^2$, $q^3$. The plunger $j$ is reciprocated by means of an eccentric $r$ on shaft $m$, and rods $r^1$, $r^2$ with interposed link $r^3$ for adjusting the stroke of the plunger, said link being operated as by means of a hand wheel $r^4$ and worm gearing $r^5$. Adjustment of one of the feed rolls may be effected by mounting same in sliding bearings operated by a hand wheel $s$ and worm gearing $s^1$.

What I claim as my invention and desire to secure by Letters Patent of the United States is:—

1. In a machine for feeding plastic material into receptacles, the combination of a hopper, a measuring chamber positioned for communication with said hopper, a discharge nozzle connected for communication with said measuring chamber, said valve being operable to open and close communication between the measuring chamber and the hopper and likewise between the discharge nozzle and the measuring chamber, feed rolls positioned intermediate the hopper and the measuring chamber for forcing material into the latter, and means for operating said feed rolls whereby the rotation thereof is arrested when the valve cuts off communication between the hopper and the measuring chamber.

2. In a machine for feeding plastic material into receptacles, the combination of a hopper, stirring means therein, revoluble feed rolls closing the lower end of said hopper, a measuring chamber in communication with said hopper and terminating at one end in a discharge nozzle, a rotary valve in said chamber adapted to open and close communication between the hopper and measuring chamber and between the latter and the discharge nozzle, said valve having a curved passage of approximately the same cross sectional area as that of the measuring chamber, means for intermittently operating said feed rolls so as to arrest the rotation thereof when the valve cuts off communication between the hopper and the measuring chamber, and a reciprocatory plunger in the measuring chamber adapted to force material through the valve when the latter is open to the discharge nozzle, substantially as described.

3. In a machine for feeding plastic material into receptacles, the combination of a hopper, rotary stirring paddles therein, revoluble feed rolls closing the lower end of said hopper, a measuring chamber in communication with said hopper and terminating at one end in a discharge nozzle, a rotary valve in said chamber adapted to open and close communication between the hopper and measuring chamber and between the latter and the discharge nozzle, said valve having a curved passage of approximately the same cross sectional area as that of the measuring chamber, means for intermittently imparting rotative movement to said feed rolls, said means operating to arrest the rotation of the feed rolls at the time the valve cuts off communication between the hopper and the measuring chamber, a reciprocatory plunger in the measuring chamber adapted to force material through the valve when the latter is open to the discharge nozzle, and a reciprocatory cut off knife co-acting with said discharge nozzle, substantially as described.

4. In a machine for feeding plastic material into receptacles, the combination of a hopper, rotary stirring paddles therein, revoluble feed rolls closing the lower end of said hopper, a measuring chamber in communication with said hopper and terminating at one end in a discharge nozzle, a rotary valve in said chamber adapted to open and close communication between the hopper and measuring chamber and between the latter and the discharge nozzle, said valve having a curved passage of approximately the same cross sectional area as that of the measuring chamber, a reciprocatory plunger in the measuring chamber adapted to force material through the valve when the latter is open to the discharge nozzle, a reciprocatory cut off knife co-acting with said discharge nozzle, means for actuating said knife, means for intermittently rotating the feed rolls and paddles, said means being operable to arrest the rotation of the feed rolls when the valve closes communication between the measuring chamber and the hopper, means for oscillating the valve, and means for reciprocating the plunger, substantially as described.

5. In a machine for feeding plastic material into receptacles, the combination of a hopper, rotary stirring paddles therein, revoluble feed rolls closing the lower end of said hopper, a measuring chamber in communication with said hopper and terminating at one end in a discharge nozzle, a rotary valve in said chamber adapted to open and close communication between the hopper and measuring chamber and between the latter and the discharge nozzle, said valve having a curved passage of approximately the same cross sectional area as that of the measuring chamber, a reciprocatory plunger in the measuring chamber adapted to force material through the valve when the latter is open to the discharge nozzle, a reciprocatory cut off knife co-acting with said discharge nozzle, a cam operated lever for actuating said knife, means for rotating the feed rolls and paddles including interrupted gearing, said means being operable to arrest the rotation of the feed rolls when the valve closes communication between the measuring chamber and the hopper, means for oscillating the valve including a pinion on the valve spindle, a quadrant meshing therewith and a cam operated lever for rocking said quadrant and means for reciprocating said plunger including an eccentric, an adjustable link and connections between said link and the eccentric and plunger respectively, substantially as described.

In witness whereof I have signed this specification in the presence of two witnesses.

GEORGE SAMUEL BAKER.

Witnesses:
H. D. JAMESON,
H. V. PUMFREY.